US011205776B2

United States Patent
Kao et al.

(10) Patent No.: US 11,205,776 B2
(45) Date of Patent: Dec. 21, 2021

(54) LITHIUM METAL OXIDE CATHODE MATERIALS AND METHOD TO MAKE THEM

(71) Applicant: Dow Global Technologies LLC, Midland, MI (US)

(72) Inventors: Yu-Hua Kao, Shrewsbury, MA (US); Murali G. Theivanayagam, New Castle, DE (US); Jui-Ching Lin, Midland, MI (US); Jianxin Ma, Wilmington, DE (US); Liang Chen, Midland, MI (US); Michael Lowe, Midland, MI (US); Hideaki Maeda, Tokyo (JP); Ing-Feng Hu, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 345 days.

(21) Appl. No.: 15/311,863

(22) PCT Filed: May 14, 2015

(86) PCT No.: PCT/US2015/030746
§ 371 (c)(1),
(2) Date: Nov. 17, 2016

(87) PCT Pub. No.: WO2015/183568
PCT Pub. Date: Dec. 3, 2015

(65) Prior Publication Data
US 2017/0084919 A1    Mar. 23, 2017

Related U.S. Application Data

(60) Provisional application No. 62/003,174, filed on May 27, 2014.

(51) Int. Cl.
*H01M 4/525* (2010.01)
*H01M 4/505* (2010.01)
(Continued)

(52) U.S. Cl.
CPC ............ *H01M 4/525* (2013.01); *C01G 53/50* (2013.01); *H01M 4/362* (2013.01); *H01M 4/364* (2013.01);
(Continued)

(58) Field of Classification Search
CPC ...... H01M 4/525; H01M 4/364; H01M 4/505; C01G 53/50
See application file for complete search history.

(56) References Cited

U.S. PATENT DOCUMENTS

| 5,393,622 A | 2/1995 | Nitta et al. |
| 5,858,324 A | 1/1999 | Dahn et al. |

(Continued)

FOREIGN PATENT DOCUMENTS

| EP | 0813256 A2 | 12/1997 |
| EP | 0918041 A1 | 5/1999 |

(Continued)

OTHER PUBLICATIONS

Kim et al., KR-20140012483-A, English machine translation, Feb. 2014, Korea, pp. 1-10.*

(Continued)

*Primary Examiner* — Tae-Sik Kang
(74) *Attorney, Agent, or Firm* — William R Hales

(57) ABSTRACT

A method for forming lithium metal oxides comprised of Ni, Mn and Co useful for making lithium ion batteries comprises providing precursor particulates of Ni and Co that are of a particular size that allows the formation of improved lithium metal oxides. The method allows the formation of lithium metal oxides having improved safety while retaining (Continued)

good capacity and rate capability. In particular, the method allows for the formation of lithium metal oxide where the primary particle surface Mn/Ni ratio is greater than the bulk Mn/Ni. Likewise the method allows the formation of lithium metal oxides with secondary particles having much higher densities allowing for higher cathode densities and battery capacities while retaining good capacity and rate performance.

8 Claims, 2 Drawing Sheets

(51) Int. Cl.
| | |
|---|---|
| *H01M 4/58* | (2010.01) |
| *C01G 53/00* | (2006.01) |
| *H01M 4/36* | (2006.01) |
| *H01M 10/0525* | (2010.01) |
| *H01M 10/052* | (2010.01) |
| *H01M 4/02* | (2006.01) |

(52) U.S. Cl.
CPC ......... *H01M 4/505* (2013.01); *H01M 4/5825* (2013.01); *H01M 10/0525* (2013.01); *C01P 2002/50* (2013.01); *C01P 2002/52* (2013.01); *C01P 2002/85* (2013.01); *C01P 2004/03* (2013.01); *C01P 2004/51* (2013.01); *C01P 2004/61* (2013.01); *C01P 2004/62* (2013.01); *C01P 2006/11* (2013.01); *C01P 2006/12* (2013.01); *C01P 2006/40* (2013.01); *H01M 10/052* (2013.01); *H01M 2004/021* (2013.01); *H01M 2004/028* (2013.01)

(56) References Cited

U.S. PATENT DOCUMENTS

| | | |
|---|---|---|
| 6,168,887 B1 | 1/2001 | Dahn et al. |
| 6,333,128 B1 | 12/2001 | Sunagawa et al. |
| 6,368,749 B1 | 4/2002 | Yanai et al. |
| 6,964,828 B2 | 11/2005 | Lu et al. |
| 7,169,511 B2 | 1/2007 | Noda et al. |
| 7,211,237 B2 | 5/2007 | Eberman et al. |
| 7,341,805 B2 | 3/2008 | Ueda et al. |
| 7,482,382 B2 | 1/2009 | Li et al. |
| 7,592,100 B2 | 9/2009 | Ohzuku et al. |
| 2005/0152831 A1* | 7/2005 | Tasaki ................ C01G 45/1242 423/599 |
| 2012/0134914 A1* | 5/2012 | Paulsen .................... H01B 1/08 423/594.15 |

FOREIGN PATENT DOCUMENTS

| | | | |
|---|---|---|---|
| EP | 0944125 A1 | | 9/1999 |
| EP | 1295851 A1 | | 3/2003 |
| JP | 11307094 A | | 11/1999 |
| JP | 2006278030 A | | 10/2006 |
| KR | 20140012483 A | * | 2/2014 |
| KR | 20140012483 A | | 2/2014 |

OTHER PUBLICATIONS

Delmas, C. et al., Solid State Ionic ¾ (1981) 165-169.
Jarvis, K.A. et al., Chem. Mater. 2011, 23, 3614-3621.
Jin Chong, et al., Journal of Power Sources 196 (2011) pp. 7707-7714.
Hsien-Chang Wu et. al., Journal of Power Sources 197 (2012) pp. 301-304.

* cited by examiner

LITHIUM METAL OXIDE CATHODE MATERIALS AND METHOD TO MAKE THEM

FIELD OF THE INVENTION

The invention relates to a method of making improved lithium metal oxide (LMO) cathode materials for use in lithium ion batteries (LIBs) and method to make them. In particular the invention relates to LMOs where the metal is comprised of Ni, Mn and Co and the Ni is 40 mole % or more of said metals in the LMO.

BACKGROUND OF THE INVENTION

Lithium ion batteries have over the past couple of decades been used in portable electronic equipment and more recently in hybrid or electric vehicles. Initially, lithium ion batteries first employed lithium cobalt oxide cathodes. Due to expense, toxicological issues and limited capacity other cathode materials have or are being developed.

One class of materials that has been developed and has been commercially employed is lithium metal oxides (LMOs) comprised of two or more of nickel, manganese and cobalt and in particular when all three of these metals are present. These materials generally display a layered structure with a singular rhombohedral phase in which initial high specific charge capacities (typically from 155 to 170 mAh/g) have been achieved when charged to voltages of about 4.2 volts vs Li/Li$^+$. Unfortunately, these materials have suffered from a short cycle life and safety issues related to oxygen evolution under certain conditions resulting in fires.

Li/Li+ represents the redox potential of the lithium reference electrode, which is defined as 0 volts by convention. Consequently, when using an anode other than Li metal, these voltages would be decreased to account for the difference in potential between this other anode and Li metal. Illustratively, a fully charged graphite anode has a potential of about 0.1 V vs Li/Li+. Therefore, when charging the cathode in a battery with a graphite anode to 4.25 V vs Li/Li+, the cell voltage will be approximately 4.15 V.

The cycle life is generally taken as the number of cycles (charge-discharge) before reaching a specific capacity that is 80% of the initial specific capacity. Each cycle for these materials is typically between 4.2 volts to 2 volts. These batteries have also suffered from inconsistencies in performance from one battery or cell to another, even though made from the same materials.

These LMOs may contain dopants or coatings that improve one or more properties such as cycle life. They generally are stoichiometric or essentially stoichiometric such as those described by U.S. Pat. Nos. 6,964,828; 6,168,887; 5,858,324; 6,368,749; 5,393,622 and European Pat. Publ. Nos. EP1295851, EP0918041, and EP0944125 and Japanese Patent Disclosure No. 11-307094.

These lithium metal oxides have been made by solid state synthesis where particulate precursors are mixed or milled and then heated to a temperature to form the LMO. Examples of this method are described in U.S. Pat. Nos. 6,333,128; 7,211,237 and 7,592,100, but as described in U.S. Pat. No. 7,592,100 (col. 7, line 38 to col. 8, line 43) solid state synthesis methods are not desirable because of the difficulty in making a single phase layered material and the requirement to use very small size particles.

The lithium metal oxides have also been formed by first precipitating a complex precursor in continuously stirred reactors with the complex precursor compound subsequently heated with a lithium compound to a temperature to form the LMO. Examples of these methods are described by U.S. Pat. Nos. 7,592,100 and 6,964,828 and Japanese Patent Disclosure No. 11-307094. Other methods have also been described such as hydrothermal methods and sol gel methods to form the complex oxides. Examples of these are described in U.S. Pat. No. 7,482,382 and EP0813256.

Consequently, LMOs have tended to be made from complex metal compounds, "LMO precursors," precipitated from a continuously stirred reactor that are then mixed with lithium containing compounds and heated sufficiently to form the LMOs. They have generally been made this way to avoid the problems encountered with simple dry mixing of precursors such as non-uniformity of the chemistry, primary grain/particle size and secondary particle size.

Unfortunately, continuous stirred reactors require long reaction residence times to achieve desired secondary particle size, varying reaction conditions that preclude them from being used continuously (e.g., secondary particle size growth over time) and large capital investment due to large tanks necessary to make the LMOs on a production scale. Likewise, because of the inherent constraints of a precipitation process, the LMOs that are formed are very similar and they tend to form LMOs that suffer from low cathode density and low safety particularly for compositions with high Ni contents.

Accordingly, it would be desirable to provide an LMO and method to make the LMO that provides for an LIB having a high voltage, higher energy capacity, greater cycleability and improved safety.

SUMMARY OF THE INVENTION

The applicants have discovered a method for making LMOs that realizes an LMO that enables an LIB to have improved safety, higher cyclability, higher energy density and higher operating voltages.

A first aspect of the invention is method to make a lithium metal oxide powder comprised of Li, Ni, Mn, Co and oxygen useful to make a lithium ion battery cathode, comprising
  (a) providing a precursor mixture comprising a particulate precursor comprised of Li, Ni, Co and oxygen and a Mn particulate precursor devoid of Ni and Co, wherein the precursor particulate comprising Ni and Co has an unagglomerated primary particle size having a D50 of 0.1 to 0.8 micrometer, D10 of 0.05 to 0.3 micrometer, D90 of 0.35 to 1.5 micrometer and no particles essentially larger than 3 micrometers,
  (b) agglomerating the precursor mixture to form secondary particles comprised of primary particles of the particulate precursor comprised of Li, Ni, Co and oxygen and the Mn particulate precursor,
  (c) heating the secondary particles under an oxygen containing atmosphere to a temperature and time to form the lithium metal oxide.

The method of the first aspect has surprisingly been able to form an LMO that improves safety even when the Ni content is high, increases cycle life, and increases energy capacity of LIBs made from the LMO. It is believed, without limiting the invention in any way, that the discovery that the final primary particle size is correlated with the Ni and Co precursor size along with the desirability of having a significant amount of particles greater than 0.5 micrometers has enabled the formation a LMO with a particular primary particle size, primary particle chemical composition (i.e., allows a safer gradient structure), density of secondary particles and secondary particle size and distribution not previously achievable. All of these to a large extent are achieved without compromising good rate capability of the LIB.

A second aspect of the invention is a lithium metal oxide comprised of primary particles agglomerated into secondary particles, the lithium metal oxide being comprised of Li, Ni, Mn, Co and oxygen, wherein the lithium metal oxide has a bulk Mn/Ni ratio and the primary particles have a surface Mn/Ni ratio such that the surface Mn/Ni ratio is greater than the bulk Mn/Ni ratio.

A third aspect of the invention is a lithium metal oxide comprised of primary particles agglomerated into secondary particles, the lithium metal oxide being comprised of Li, Ni, Mn, Co and oxygen, wherein the secondary particles have a porosity of at most about 5 percent.

A fourth aspect of the invention is a lithium metal oxide comprised of primary particles agglomerated into secondary particles, the lithium metal oxide being comprised of Li, Ni, Mn, Co and oxygen, wherein the secondary particles have a D50 of 10 to 35 micrometers, D10 of 6 to 10 micrometers, D90 of 20 to 45 micrometers and no particles essentially greater than 100 micrometers. The LMOs, of this invention, have been discovered to be able to make spherical secondary particles, such as formed by spray drying, that maintain their structure upon heating and mild pulverizing to separate the secondary particles after heating. In a preferred embodiment, it is preferred that there is essentially no secondary particles less than about 5 micrometers equivalent spherical diameter. This avoids, for example, the formation of fractured secondary particles and presence of individual primary particles, which are believed to decrease, for example, cycle life.

A fifth aspect of the invention is a cathode comprising a layer of lithium metal oxide of any one of the previous aspect's lithium metal oxide and a lithium metal cathode material other than the lithium metal oxide adhered to a metal foil. It has been surprisingly discovered that when employing an LMO of this invention, particularly those displaying the characteristics of the third and fourth aspects of this invention, highly dense cathodes may be made allowing a substantial increase in the battery capacity without deleteriously affecting other desirable battery characteristics such as rate performance. In a particular embodiment, the LMO of the fourth aspect of this invention is mixed with a lesser amount of LMO which is unagglomerated (i.e., individual primary particles). In another embodiment, the LMO is mixed with a lithium metal cathode material such as a lithium metal phosphate, which surprisingly realizes good electrochemical performance and even further improved safety performance.

DETAILED DESCRIPTION OF THE INVENTION

Figure 1:
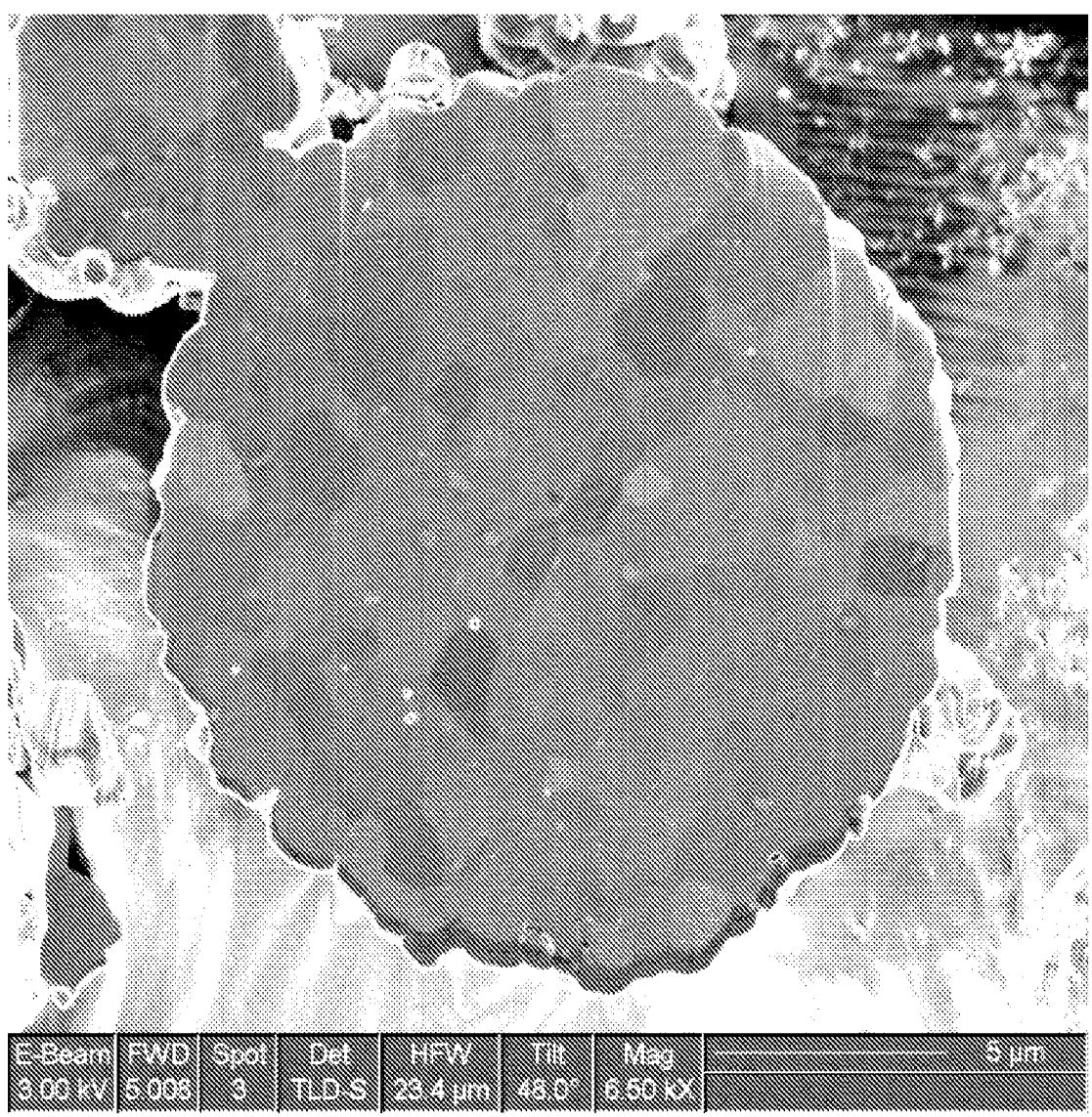
FIG. 1 is a scanning electron micrograph of a cross-section of a secondary particle of a lithium metal oxide of this invention.

Illustratively, the lithium metal oxide bulk chemistry is represented by a formula:

$Li_xM_yO_2$

Where $0.8<x<1.15$, y is 1 and the metal is comprised of Ni, Co and Mn. Desirably, x is $0.85<x<1.1$ or $0.9<x<1.05$. It has been surprisingly discovered that a slight deficiency of Li may be desirable particularly when there is a high Ni concentration present (e.g., when Ni is 0.55 or greater). It is understood that the Li upon use in a battery (i.e., upon charging) the amount of Li is reduced from the Li just given and upon charging the Li is increased near the amount of the above formulas.

In a preferred embodiment, the amount of Ni, Mn and Co is expressed by: $Ni_{1-a-b}Mn_aCo_b$ where $0.1 \le a \le 0.9$ and $0 \le b \le 0.8$. In a preferred embodiment a and b are $0.1 \le a \le 0.4$ and $0.1 \le b \le 0.4$ and even more preferably $0.1 \le a \le 0.25$ and $0.1 \le b \le 0.25$. In a preferred embodiment the ratio of Ni/(Co+Mn) is 0.5 to 9 and more preferably from 1 to 3.

It is understood that the LMOs may also contain small amounts of dopants that improve one or more properties, with an example being fluorine or other metals. Exemplary dopant metals include, but are not limited to Al, Ti, Mg, Ca, In, Ga, Ge, Si, or a combination thereof. Likewise, the lithium metal oxides may also be coated with various coatings to improve one or more properties after they have been doped such as oxides of the above dopant metals. Such dopants are generally present in a molar amount of 10% of the dopant metals and the Ni, Mn and Co present in the LMO.

The LMOs typically display a specific capacity after being initially charged to 4.3V or 4.5V volts by a typical formation method of at least about 150 to 210 mAh/g when discharged at a C rate of 0.1 between 3 and 4.3V or 4.5V volts. A C rate of 1 means charging or discharging in 1 hour between the aforementioned voltages and a C/10 is a rate where the charging or discharging equals 10 hours and a 10C rate is equal to 6 minutes.

The bulk crystalline structure of the LMOs analyzed by X-ray diffraction essentially display a single O3 phase (i.e., R-3m space group) as described in Delmas, C. et al., Solid State Ionic 3/4 (1981) 165-169 and Jarvis, K. A. et al., Chem. Mater. 2011, 23, 3614-3621 respectively.

To reiterate applicants have discovered a method to form LMOs having excellent capacity, cycle life, safety for LMOs even with high concentrations of Ni. In particular, it has been discovered that the formation of primary particle of LMOs comprised of Ni, Co and Mn is believed to be at least in part controlled by the precursor size of the Ni and Co precursors and the uptake of Mn into an initial Ni and Co containing compound upon heating. This has allowed the avoidance of exaggerated grain growth and hard sintering of the LMO primary particles and hard sintering between secondary particles and fracturing of larger secondary particles prevalent when LMOs are made from other processes such as precipitation processes. These discoveries have now enabled the formation of LMOs having the aforementioned desired properties.

To form the LMO a precursor particulate mixture is heated to form the LMO. The precursor mixture is comprised of a Mn particulate precursor devoid of Ni and Co and a particulate precursor comprised of Li, Ni, Co and oxygen. It is understood that the Mn particulate precursor may contain a small amount of Ni and Co, such as a trace amount or at most about 5 mole % of the amount of Ni and Co desired in the bulk composition, but preferably there is essentially no Ni or Co present in the Mn particulate precursor. Likewise, it is preferred that the Mn particulate precursor is also devoid of Li. The Mn particulate precursor desirably contains oxygen.

Illustrative Mn particulate precursors include hydroxides, oxides, carbonates, hydrated forms of the aforementioned or combination of two or more of these. Preferably, the Mn particular precursor is manganese (II) oxide, manganese (III) oxide, manganese (II, III) oxide, manganese carbonate or combination thereof. More preferably, the Mn particular precursor is manganese (III) oxide or manganese carbonate.

The precursor particulate mixture also contains a particulate precursor comprised of Li, Ni, Co and oxygen. It is desirable for the particulate precursor having Li to be devoid of any other metal other than trace amounts. Any precursor having Ni and Co may also contain a trace amount of Mn and Li in a manner as described for the Mn particulate precursor.

In a preferred embodiment, the precursor particulate mixture is comprised of a Ni particulate precursor, a Co particulate precursor and a Li particulate precursor and the Mn particulate precursor in which each of these particulate precursors fail to contain a metal in any of the other particulate precursors. In another preferred embodiment, the precursor mixture is comprised of Ni and Co containing particulate precursor, and a Li particulate precursor and the Mn particulate precursor in which each of these particulate precursors fail to contain a metal in any of the other particulate precursors.

The precursor comprised of Li, Ni, Co and oxygen may be include hydroxides, oxides, carbonates, hydrated forms of the aforementioned or combination of two or more of these. Illustrative suitable precursors include, for example, lithium carbonate, nickel hydroxide, nickel carbonate hydroxide tetrahydrate, cobalt hydroxide, and nickel cobalt hydroxide [$NiCo(OH)_2$].

The particulate precursor comprised of Ni and Co needs to have a primary particle size and size distribution, which is given by the median size (D50), D10, D90 and a maximum size limitation. The size is the equivalent spherical diameter by volume which may be measured by micrographic techniques, but preferably is measured by a laser light scattering method using dispersions of the solids in liquids at low solids loading. D10 is the size where 10% of the particles have a smaller size, D50 is the size where 50% of the particles have a smaller size and D90 is the size where 90% of the particles have a smaller size by volume.

It has been found that it is essential to have particulate precursors containing Ni and Co to form LMOs having highly packed secondary particles (agglomerated primary particles having low porosity) while still realizing other desirable results.

The D50 of the precursor particulates having Ni and Co generally is from about 0.1 to 0.8 micrometers, the D10 is 0.05 to 0.3 and D90 is 0.35 to 1.5 micrometer with essentially no particles being larger than about 3, about 2.5 or even about 2 micrometers (also referred to as D100). It is believed, without being limiting, that it is critical to have a significant amount of particles greater than 0.5 micrometers in size so as to realize, for example, the above improved packing of secondary particles and realize gradient structures having greater Mn at the particle surface. Preferably the D90 is 0.45, 0.5 or 0.55 to 1.4, 1.2 or 1 micrometers. However, if too many particles are greater than about 2 micrometers, the electrochemical performance appears to suffer or the ease of processing suffers.

Even though the Mn particulate precursor appears not to have a substantial effect on the final LMO primary particle size, it generally must be a size that is not too large that the heating temperature and time required to form the LMO are too great to be impractical or fail to form the desired LMO. Typically, the D50 is from about 0.2 to about 1.5 micrometers, the D10 is from about 0.05 to about 1 micrometer, the D90 is about 0.4 to about 5 micrometer, and the D100 is about 1 to about 10 micrometers. Preferably, the D10 is 0.01 to 0.8, 0.5, 0.2 or 0.1, the D50 is 0.2 to 1.3, 1.1, 1, 0.8, 0.5 or 0.4, the D90 is 0.45, 0.5 or 0.55 to 4, 3 or 1 and the D100 is 9, 7, 5, 3 or 2. In a preferred embodiment all of the particulates of precursor mixture has the aforementioned primary particle size and size distribution given for the precursor particulates having Ni and Co.

The particle size and size distribution of the particulate precursors may be formed by any suitable method, but typically requires at least some comminution such as known milling techniques. Milling, for example, may include dry milling, wet milling, jet milling and any combination thereof. The milling may be performed separate for each precursor particulate and later blended in the proper proportions by known blending methods. Milling apparatus such as ball mills, horizontal and vertical media mills, vibratory mills and attritor mills may be employed. Milling may be performed in successive milling steps to realize the desired particle size and size distribution. In a preferred embodiment, all of the precursor particulate materials are milled simultaneously.

The milling is preferably performed in a liquid. The liquid may be any having a low viscosity (e.g., less than about 100 centipoise) and may be easily removed by a technique such as spray drying. The liquid may be an organic liquid such as a ketone, alkane, ether, alcohol, ester, and the like. Preferably, the liquid is a polar solvent such as an alcohol (e.g., ethanol, butanol, propanol and methanol) or water. Preferably, the liquid is water.

When milling in a liquid the particulate precursors comprised of Ni and Co are generally at most partially soluble in the liquid. Preferably the amount of solubility is at most about 5%, more preferably at most about 2% and most preferably at most about 1% by weight soluble in the liquid. It is also desirable for the solubility to be the same for any other precursor material when milling in a liquid.

In a preferred embodiment, the milling is performed in water with each particulate precursor being present. In this particular embodiment when all of the particulate precursors are milled simultaneously in water, it has been found to be advantageous to use an organic molecule having multiple acidic groups. The use of these surprisingly allows the milling of slurries having up to 50% solids loading by weight, for example, in water. The organic molecule or dispersant may be, for example, a polyacid. Exemplary polyacids include polyacrylic acid (typical molecular weights of 2000 to 100,000), polylmethacrylic acid, polystyrene sulfonic acid and the like.

The amount of dispersant typically is any amount that is useful to allow the milling to small particle size at high solids loading (e.g., greater than about 40% or 45% solids loading by weight) while still having a low viscosity and does not gel (i.e., less than about 10,000 centipoise, but preferably less than about 5000 or even 2000 centipoise). Generally, the amount of dispersant is as little as possible and generally is at most about 5%, 3%, 2% or 1% to at least about 0.01% by the total weight of the slurry.

The particular mills, media, time and particular parameters when employing milling may be any suitable such as those readily known in the ceramic arts. Generally, the media may be any of those commercially available, including for example, carbide media (SiC, WC with or without Co, mixed metal carbides with or without Co), $ZrO_2$, $Al_2O_3$ and combination thereof. A preferred media is yttria stabilized zirconia.

Once the precursor mixture is provided, the particulates are agglomerated to form secondary particles. As described above, the precursor mixture may be blended to form the mixture or milled dry or in a liquid separately and then combined or simultaneously. If the precursor mixture is provided dry, the agglomerating into secondary particles, for example, may be performed dry by a method such as mechanofusion in commercially available equipment from Hosokawa Micron Ltd. Preferably, each of the particulate precursors are dispersed into a liquid to form a slurry and then dried by a technique such as spray drying, freeze drying, super critical drying or the like. Preferably, the agglomerating is performed by spray drying of an aqueous slurry of the precursor mixture.

When spray drying from a liquid, it is preferred that the solids loading is at least 10%, more preferably at least 20%, even more preferably at least 30%, and most preferably at least 40% solids loading by weight to any achievable amount without gelling or where the liquid is too viscous to easily pump to the spray dryer (e.g., greater than 500,000 centipoise).

When forming the secondary particles, particularly by spray drying, it has been discovered that when the precursor particles have the aforementioned size, one can realize secondary particles that when formed into the LMO upon heating have essentially no free primary particles. In other words, it has been discovered that the secondary particles when heated fail to fracture, thus allowing for formation of an LMO that has a low surface area, broad size distribution, while still retaining good charge and discharge rate capability.

Desirable secondary particle size and size distributions (volumetric equivalent spherical diameter in micrometers) are when the secondary particles have a D50 of 10 to 35 micrometers, D10 of 6 to 10 micrometers, D90 of 20 to 45 micrometers and no particles essentially less than about 5 micrometers. Preferably, the D50 is 12 or 15 to about 30 micrometers, the D90 is about 25 to about 40 micrometers. The particle size and size distribution may be determined by known techniques such as microscopic, sieving, or light scattering techniques.

After the secondary particles are formed, they are heated to a temperature in an oxygen containing atmosphere. The particular final or maximum temperature may vary depending on the chemical composition that is desired (i.e., amounts of Ni, Mn and Co). Typically, the maximum temperature is from about 890° C. to about 970° C. Preferably, the temperature is from 930° C. to 960° C.

The time the particles are held at the maximum temperature are typically at least about 5 minutes to about 10 hours, but it is preferred that the time is 15 minutes or 30 minutes to 7.5 hours or 5 hours. It has been discovered that much greater times tend to cause larger primary grains and at times exaggerated grain growth, whereas lower temperatures fail to form the desired secondary particle microstructure (e.g., low porosity secondary particles).

The heating may have a lower temperature hold during the heating (i.e., lower interim temperature holds). These may be performed, for example, to ensure uniformity of the temperature throughout the mixture, removal of undesired components (e.g., organic material or decomposition of the precursors to oxides) or formation of desirable interim phases useful to make the final lithium metal oxide. Typically, such interim temperatures occur from about 250° C. to 850° C. At least one of the interim temperatures is desirably at least 400° C., 500° C. or 600° C. to at most about 800° C., 750° C. or 700° C. The time at these temperatures is akin to those described for the maximum or final temperature above.

The heating may have any heating or cooling rate that is practical while achieving the desired lithium metal oxide. Typically the heating rates are at least 0.1° C./min to 250° C./min More typical rates are on the order of 1° C./min or 5° C./min to 50° C./min or 20° C./min The heating occurs in an oxygen containing atmosphere, but it has been surprisingly discovered that atmospheres comprised primarily of oxygen or pure oxygen are not desirable and tend to form less than desired lithium metal oxide. The oxygen containing atmosphere preferably has a partial pressure of oxygen of at least about 0.1 to 0.3 or 0.25 atmosphere (atm). Even though the atmosphere may be dynamic (e.g, flowing), the atmosphere is desirably static. In a preferred embodiment, the atmosphere may be flowing up to a lower interim temperature and then static up to the maximum temperature. Likewise, the oxygen partial pressure may be decreased during the heating.

The method has enabled the formation of lithium metal oxides containing high concentrations of Ni with much enhanced safety performance, which is believed to be due to the newly discovered ability to form such lithium metal oxides with primary particles having a gradient structure. In particular, the inventors have discovered a lithium metal oxide comprised of primary particles agglomerated into secondary particles, the lithium metal oxide being comprised of Li, Ni, Mn, Co and oxygen, wherein the lithium metal oxide has a bulk Mn/Ni ratio and the primary particles have a surface Mn/Ni ratio such that the surface Mn/Ni ratio is greater than the bulk Mn/Ni ratio.

The bulk Mn/Ni ratio is the desired composition of the $LiMO_2$ and may be determined by bulk analytical techniques for determining elemental composition. The surface Mn/Ni ratio of the primary particles is determined by X-ray photoelectron spectroscopy (XPS). That is the surface Mn/Ni ratio is an average of the surface ratio of a sample of powder and not a measurement of individual primary particle's gradient composition that is then later averaged. The XPS technique is described further below.

It is desirable for the surface Mn/Ni ratio to be at least 1%, 2% or even 5% greater to at most about 20% greater than the bulk Mn/Ni ratio. As mentioned, the surface Mn/Ni ratio is desirably greater when the Ni concentration of the lithium metal oxide is great, because of the surprising improvement in safety. For example, it is desirable to have such Mn/Ni ratios when the Ni/(Mn+Co) molar ratio is 0.5 to 3 (bulk chemistry or desired chemistry when making the lithium metal oxide). More desirably, such Ni/(Mn+Co) molar ratio is 0.75 to 2.

The primary particle size of the lithium metal oxide has been discovered to be correlated with the Ni and Co containing precursor particulate size. As such the lithium metal oxide displaying the surface Mn/Ni ratio has a size akin to the sizes described above for these precursors allowing for some grain growth during the heating. Generally, the primary particle size is within 20%, 10% or 5% of the size Ni and Co particulate precursor sizes described above or essentially the same.

Such size, particularly of the larger primary particles coupled with the surface Mn/Ni ratio is, without being limiting, believed to contribute to the improved safety of such lithium metal oxides even with high Ni concentrations while not substantially decreasing other desired performance characteristics. The gradient again without being limiting is believed to be due to the initial formation of a Ni and Co oxide particulate phase, which then must have the Mn diffuse into the larger particles leading to the gradient.

It is also has been discovered that a lithium metal oxide may be formed by the invention's method that has primary particles agglomerated into secondary particles, the lithium metal oxide being comprised of Li, Ni, Mn, Co and oxygen, wherein the secondary particles have a porosity of at most about 5 percent. Preferably, the porosity is at most about 4, 3 or even 2 percent.

Because the method employs the aforementioned particle size of the Ni and Co particulate precursor coupled with the discovery that the resultant lithium metal oxide size correlates therewith and when heated as described above, secondary particles may be formed that have low porosity without exaggerated grain growth. Even though the secondary particles have low porosity, the lithium metal oxide still may display good specific capacity and good rate capability.

The lithium metal oxide having the low porosity secondary particles may, but does not necessarily, have the surface Mn/Ni ratio described above. It is desirable, however that such particles do have the ratio and each of the other attributes described for lithium metal oxide having the above Mn/Ni ratio.

In a preferred embodiment, it has been discovered that lithium metal oxide may be formed into secondary particles that do not fracture upon heating when using the above method. When the lithium metal oxide has such a secondary particle size, a lithium metal oxide with improved cycle life may be formed. Such secondary size and shape are in essence the same as that given for the spray dried secondary particles described above. Surprisingly, the method allows for close correlation of these, because the lithium metal oxide secondary particles themselves have good mechanical integrity, but do not substantially sinter together and thus are easily broken apart (final pulverization of the lithium metal oxide) without fracturing the secondary particles themselves when doing so.

Typically the lithium metal oxide with the above secondary particle size has a surface area that is about 0.75 m$^2$/g or preferably at most about 0.6, 0.5 or 0.4 m$^2$/g to at least about 0.1 m$^2$/g. Likewise, lithium metal oxide displays a tap density of at least about 40% of the theoretical density of said lithium metal oxide, which is highly desirable when forming a cathode layer on a metal foil described further below. Typically, the tap densities are desirably at least about 1.15. Preferably the tap density is at least about 1.5, 1.75, 2 or even 2.1 g/cc.

The aforementioned lithium metal oxide having the surface Mn/Ni ratio or low porosity secondary particles preferably have the just described secondary particle size as well.

The LMO made by the method of this invention or any LMO of this invention may be formed into a cathode by adhering the LMO to a metal foil using conventional binder and processes.

Illustratively, the lithium metal oxide of this invention may be used alone or with another battery cathode material such as those known in the art (e.g., lithium metal phosphates, nickel cobalt aluminum oxides or other oxides comprised or nickel and manganese). In a particular embodiment, any one of the lithium metal oxides of this invention, but particularly one having the aforementioned secondary particle size is mixed with the lithium metal oxide comprised essentially of free primary particles and no secondary particles and the primary particle size and size distribution essentially being the same as described for the primary particles described herein.

In another embodiment, the LMOs of this invention are mixed with another lithium metal cathode material such as those known in the art and in particular lithium aluminum cobalt oxides or lithium metal phosphates. It has been surprisingly found that lithium ion batteries having LMOs with high Ni contents (e.g., where Ni is present in an amount of 50% by mole of the metals in the LMO other than lithium) may be mixed with a lithium metal phosphate without significant reduction in electrochemical performance with even further improvements in safety. The lithium metal phosphate is desirably one where the metal is comprised of a transition metal and may be further comprised of an alkaline metal. Desirably the metal may be Mn, Co, Fe with these being doped with a small amount of alkaline metal such as Mg. Desirably, the transition metal is primarily Mn (e.g., greater than 50% by mole of the metals other than Li). Examples of these preferred lithium metal phosphates are described by copending application having an inventor Shrikant Khot, PCT/US13/029597 incorporated herein by reference.

The LMOs are mixed in a solvent so as to allow for a uniform mixture to be formed. The solvent may be any suitable solvent such as those known in the art and typically are polar and apolar organic solvents with low water contents (e.g., 500 ppm or less and preferably less than 100, 50, 10 or even 1 ppm). Examples of useful solvents include organic solvents such as n-methyl pyrrolidone (NMP) and acetone and polar solvents such as water and those described by Jin Chong, et al., *Journal of Power Sources* 196 (2011) pp. 7707-7714.

The amount of solids (e.g., lithium metal oxide) may be any useful amount. Typically the amount is from 10% to 90% by volume of the solvent and may be at least 20% or 30% to at most 80% or 70%.

Typically, the mixing is under any shear such as simple paddle mixers with or without baffles or a high shear mixer (e.g., colloid mill) may be used. Generally, the shear rate is at most about 5000 sec$^{-1}$ and generally is about 1 sec$^{-1}$ to about 1000 sec$^{-1}$. Other known additives useful for casting slurries on to foils may be utilized, such as suitable dispersants, lubricants, binders and water scavengers.

The mixing is performed for a time to disperse the lithium metal oxide and lithium metal phosphate sufficiently so that the desired results are achieved. Typically the time may be from several minutes to any time that is practicable such as days or hours.

The mixture is then coated on to a metal foil that is useful for making electrodes in batteries such as aluminum, carbon coated aluminum, etched aluminum, nickel, copper, gold, silver, platinum, and alloys of the aforementioned or combinations thereof and include those described in Hsien-Chang Wu et. al., *Journal of Power Sources* 197 (2012) pp. 301-304.

The coating of the slurry may be done by any useful technique such as those known in the art. Typically, the method employed is doctor blade casting at a desired gap.

The solvent is then removed to form the cathode. The removing may be any suitable method such as evaporating with or without heating under as static or flowing air or other suitable atmosphere such as dry air, inert atmosphere (nitrogen or inert gas such as a noble gas) or vacuum. If heating is employed, the temperature is any useful for the particular solvent employed and may be 30° C. to 500° C., but is preferably 50 to 150° C. The time may be any suitable time such as several minutes to days or hours. The heating may be any useful heating such as resistance, convection, microwave, induction or any known heating method.

In an embodiment, after the solvent has been removed, the cathode is further subjected to pressing. This pressing in many instances is referred to a calendaring in the art to further increase the density of the cathode coating on the metal foil. Typically, calendaring is performed by passing the cathode through a roll press with a set gap to realize a cathode with uniform thickness. The cathode may be passed through the roll press multiple times with changing gaps or the same gap depending on the behavior of the coating. Generally, the pressure is at most about 250 MPa and is desirably at most about 180, 170 or 160 MPa to some low pressure which may be at least about 10 MPa.

In the preferred embodiment employing the lithium metal oxide of this invention (secondary particle size and any other attribute attainable by the method as described above), the coating on the metal foil has a density of about 3 or 3.5 g/cc to about 4 g/cc.

LIBs comprised of a cathode having any one of the invention's LMOs may have any suitable design. Such a battery typically comprises, in addition to the cathode, an anode, a porous separator disposed between the anode and cathode, and an electrolyte solution in contact with the anode and cathode. The electrolyte solution comprises a solvent and a lithium salt.

Suitable anode materials include, for example, carbonaceous materials such as natural or artificial graphite, carbonized pitch, carbon fibers, graphitized mesophase microspheres, furnace black, acetylene black, and various other graphitized materials. Suitable carbonaceous anodes and methods for making them are described, for example, in U.S. Pat. No. 7,169,511. Other suitable anode materials include lithium metal, lithium alloys, other lithium compounds such as lithium titanate and metal oxides such as $TiO_2$, $SnO_2$ and $SiO_2$, as well as materials such as Si, Sn, or Sb. The anode may be made using one or more suitable anode materials.

The separator is generally a non-conductive material. It should not be reactive with or soluble in the electrolyte solution or any of the components of the electrolyte solution under operating conditions but must allow lithium ionic transport between the anode and cathode. Polymeric separators are generally suitable. Examples of suitable polymers for forming the separator include polyethylene, polypropylene, polybutene-1, poly-3-methylpentene, ethylene-propylene copolymers, polytetrafluoroethylene, polystyrene, polymethylmethacrylate, polydimethylsiloxane, polyethersulfones and the like.

The battery electrolyte solution has a lithium salt concentration of at least 0.1 moles/liter (0.1 M), preferably at least 0.5 moles/liter (0.5 M), more preferably at least 0.75 moles/liter (0.75 M), preferably up to 3 moles/liter (3.0 M), and more preferably up to 1.5 moles/liter (1.5 M). The lithium salt may be any that is suitable for battery use, including lithium salts such as $LiAsF_6$, $LiPF_6$, $LiPF_4(C_2O_4)$, $LiPF_2(C_2O_4)_2$, $LiBF_4$, $LiB(C_2O_4)_2$, $LiBF_2(C_2O_4)$, $LiClO_4$, $LiBrO_4$, $LiIO_4$, $LiB(C_6H_5)_4$, $LiCH_3SO_3$, $LiN(SO_2C_2F_5)_2$, and $LiCF_3SO_3$. The solvent in the battery electrolyte solution may be or include, for example, a cyclic alkylene carbonate like ethylene carbonate; a dialkyl carbonate such as diethyl carbonate, dimethyl carbonate or methylethyl carbonate, various alkyl ethers; various cyclic esters; various mononitriles; dinitriles such as glutaronitrile; symmetric or asymmetric sulfones, as well as derivatives thereof; various sulfolanes, various organic esters and ether esters having up to 12 carbon atoms, and the like.

Analytical Techniques

The tap density of the LMOs were determined by placing about 20 grams of the LMO into a graduated cylinder and tapping for 2000 times using a TAP-2s tap density tester available from Logan Instruments Corporation, Somerset, N.J.

The particle size and size distribution (equivalent spherical diameter by volume) was measured using a Coulter particle size analyzer (Coulter LS230, Beckman Coulter Inc., Brea, Calif.) of the primary particles were determined. To perform the test, 2 drops of an aqueous slurry of particulate precursor after being milled is added to 10 ml deionized water and sonicated for 30 seconds. The particle size is then analyzed by the particle size analyzer.

The Mn/Ni ratio was determined XPS using "Kratos AXIS 165, S/N 315-91898/2" with monochromatic Al Ka x-ray source operated at 14 kV and 10 mA. To determine the Mn/Ni ratio at least two samples are tested. Each sample tested was placed in an aluminum sample holder having a sample cavity that was 7 mm in diameter and 3 mm in deep. The analysis area was 550(x)×180(y) micrometers. The Mn/Ni ratio was determined by integrating the Mn and Ni 2p peaks. Even though there is a potential interference between the Ni LMM Auger lines and Co 2p 3/2 and Mn2p 3/2 peaks, it was not relevant since it was much less than the standard deviation of the measurement.

The bulk chemistry of the LMO was determined by Inductive coupled plasma atomic emission spectroscopy (ICP-AES). The LMO was first dissolved by weighing 0.10 g portions in 50 mL polypropylene test tubes. Four mL of 50% (v/v) hydrochloric acid and 100 µL of concentrated hydrofluoric acid were added and heated on a heating block at approximately 85° C. for 30 minutes. Then 2.0 mL of concentrated nitric acid was added and heated for an additional 5 minutes. The tubes were then removed from the heating block and diluted with deionized water.

The prepared solutions were analyzed using ICP-AES on a Perkin Elmer 7300 DV inductively coupled plasma optical emission spectrometer using a 5 µg/mL Eu internal standard.

20 Ah stacked cells were subject to a nail penetration test to assess their safety. After the cells were subject to an initial formation cycle, the tested cell containing the particular LMO of interest was charged to a cutoff voltage (e.g., 4.2 V, 4.15 V, 4.1 V, 4.05 V, 4 V etc.) at a 1 C rate (20A), then the voltage was held constant until the current dropped below 0.05C at room temperature. The 20 Ah cell was then penetrated with a nail at a penetration speed of 80 mm/sec and any cell combustion noted.

The oxygen evolution of charged cathodes were measured by charging the cathode to 4.3 V in coin half cell against lithium metal, then disassembling the cells in an Argon filled glove box. The electrodes were washed with dimethyl carbonate solvent to remove the electrolyte and dried under vacuum at 25° C. for 12 hours. The dried electrodes were heated under Argon at 10° C./minute in a mass spectroscopy with evolved gas analysis (oxygen) with the amount of oxygen being normalized to the commercially available LMOs (see Table 2, Comparative Example 5 "100%"). The oxygen evolution is believed to be a good indicator of the safety of batteries made with the LMO as shown by the nail penetration results.

Specific surface area was determined by nitrogen absorption as per the Brunauer-Emmett-Teller theory.

The porosity of the secondary particles were determined by ion (Ga) cross-sectioning the secondary particles and imaging the cross-section in a scanning electron microscope. The area of the pores and area of the LMO were determined using image analysis software (ImageJ) to determine the porosity.

The electrical chemical performance was determined on coin cells and 20 Ah cells that were manufactured essentially in the same way as follows. If another lithium metal cathode material was also used to make a cathode whether mixed with LMO or not it also was made into a cell to determine electrical chemical performance in the same manner as described below.

The LMO or lithium metal cathode material of each Example and Comparative Example was mixed with SUPER P™ carbon black (Timcal Americas Inc. Westlake, Ohio), and polyvinylidene fluoride (PVdF) (Arkema inc., King of Prussia, Pa.) binder in a weight ratio of LRMO: SuperP::PVdF of 94:2.5::3.5. A slurry was prepared by suspending the cathode material, conducting material, and binder in solvent N-Methyl-2-pyrrolidone (NMP) followed by homogenization in a vacuum speed mixer (Thinky USA, Laguna Hills, Calif.). The NMP to solids ratio was approximately 1.6:1 before defoaming under mild vacuum. The slurry was coated on to battery grade aluminum foil using a doctor blade to an approximate thickness of 50 micrometers and dried for thirty minutes at 130° C. in a dry convection oven. The aluminum foil was 15 micrometers thick. The cells were made in a dry environment (dew point less than or equal to −40° C.).

The electrodes were pressed on a roller press to approximately 30 micrometers resulting in an active material density as shown. The cells had a measured loading level of about 10 mg/cm². The electrolyte was ethylene carbonate/diethyl carbonate (EC:EMC, 1:3 by volume) with 1.0 M $LiPF_6$ The anode for the coin cells was 200 micrometer thick high purity lithium foil available from Chemetall Foote Corporation, New Providence, N.J. The separator was a commercially available coated separator. The anode for the 20 Ah cells was a commercially available graphite, (AGP-2 powder obtained from BTR New Energy Materials Inc., Shenzhen, China). The anode/cathode capacity ratio was 1.1 to 1.2 for the 20 Ah cells.

The cells were cycled on a MACCOR Series 4000 battery testing station (MACCOR, Tulsa, Okla.). Cells were activated by charging at C/10 to 4.3 V (Examples with $LiNi_{0.5}Mn_{0.3}Co_{0.2}O_2$) or 4.5 V ($LiNi_{0.6}Mn_{0.2}Co_{0.2}O_2$) followed by a constant voltage hold until the current drops to C/20. the initial capacity of the battery was determined at a C rate of 0.1 and then the rate capability was also determined, in order thereafter at C rates of 0.1, 0.5, 1, 2, 5, 10

EXAMPLES

The raw materials used to make the LMOs are shown in Table 1. The water used was deionized water.

Examples 1-8 and Comp. Examples 1-5

The LMO of Examples 1-8 and Comparative Examples 1-5 were made to a bulk chemistry of $LiNi_{0.5}Mn_{0.3}Co_{0.2}O_2$. Each of these Examples used the same raw materials in the same proportion necessary to make this NMC except that an excess of Li was used in an amount of 1.1. The particulate precursors used were $Li_2CO_3$, $Ni(OH)_2$, $Mn_2O_3$ and $Co_3O_4$. The particular $Ni(OH)_2$ and $Co_3O_4$ are shown in Table 1 and are used interchangeably.

All of the particulate precursors were mixed simultaneously in water at a solids loading of about 50% by weight. In addition to the water, 2% by weight of polyacrylic acid was also used to mix all the precursors. The mixture was milled in a Micromedia Bead Mill (MM-P1, Buhler Inc. Mahwah, N.J.) loaded with 0.2 to 0 3 mm diameter yttrium stabilized zirconia media (Sigmund Lindner, Germany. SiLibeads® Type ZY premium quality). The mill was run at a power of 4 KW/hour and milled for a sufficient time to realize the primary particle size as shown in Table 2. The slurry had a viscosity of about 1600-2000 centipoise measured using a Brookfield Viscometer (Model DV-II+) using a #3 RV Spindle at 22° C. (Brookfield, Mass., USA).

The slurry was agglomerated by spray drying in MOBILE MINOR™ 2000 Model II spray dryer (GEA Niro, Denmark) with the feed rate of about 2.4 to 2.8 Kg/hour with a nitrogen flow of 20% 2 SCFM and 1 bar pressure to the atomizer The inlet temperature was about 140° C. and outlet temperature was about 60 to 65° C. The spray dried agglomerated precursors had a D50 secondary particle size of 13.4 micrometers.

The spray dried agglomerated precursors (50 g) were heated in static air atmosphere in 0.19 cubic foot Blue M furnace. The spray dried agglomerated precursors were for about 5 hours to soak and then held to the temperature and time shown in Table 2. Example 6, however, was calcined in a 10 cu. ft. Unitherm® U2 furnace with the same protocol except for the 10 hr ramp to the hold temperature. After the final temperature hold, the LMO formed was cooled to room temperature in about 10 hours.

Comparative Example 5 is a commercially available LMO from Daejung Energy Materials Co. Ltd., Jeonbuk, Korea under the tradename L4L-3D12 having essentially the same chemistry as Examples 1-8 and Comparative Examples 1-4. Comparative Example 5 is formed via a precipitation process to form a precursor compound containing Ni, Co, and Mn that is then mixed with a lithium precursor and heated to form the LMO.

From Table 2, when there are too many large precursor particulate particles as in Comparative Examples 2-4 (D90 too large), it can be seen that the ability to make a useful LMO becomes problematic. That is, the electrochemical (EC) performance suffers when trying to make an LMO that may be processed commercially practicably into a dense cathode as given by a high tap density.

In contrast, Examples 7 and 8 show that when the D90 is substantially lower than Comparative Examples 2-4 even though the D100 is nearly the same, the ability to make a practicable and improved LMO is shown by the higher tap density and EC performance. Likewise, as the D100 approaches 1 micrometer and the D90 is still greater than 0.5 micrometer, LMO having excellent EC performance that is easy to process is formed.

Also when comparing Examples 1 and 8 it is apparent that the particle size of the precursor has an effect on the ability to realize a high Mn/Ni surface composition of the primary particles, which has been found to correlate with improved safety as further described below. The effect of time on the Mn/Ni ratio may also be seen when comparing Examples 1-3. The effect of temperature may also be seen when comparing Comparative Example 1, with Example 4. Comparative Example 1, was heated to a high temperature that the secondary particles sintered together to such an extent that the secondary particles could not be separated without substantially fracturing the secondary particles themselves. Examples 5 and 6 are further representative examples showing the consistency of making the LMO of this invention when the precursor containing Ni and Co of a particular size. Ex. 9, 9A, 9B and 10-13 and Comparative Ex. 5A and 5B The LMO of Example 9 was made in the same fashion as Example 1, except that the heating to form the LMO was as follows. The LMO was heated in a static air atmosphere to 600° C. in 6 hours and held at 600° C. for 4 hours, heated to 920° C. in 3 hours and then heated to 950° C. in 2 hours and held at 950° C. for 5 hours and then cooled to room temperature in 10 hours. This LMO was processed in 20 Ah cells ("Example 9A") and tested by the nail penetration test as described above. The particle size of the precursor, tap density, evolved oxygen, and EC performance is shown in Table 3.

Likewise, the same LMO was mixed with lithium manganese iron phosphate (LMFP) in a weight ratio of LMO/LMFP of 7/3 and the 20 Ah cell made in the same way as just described ("Example 9B). The LMFP was made as follows.

Iron oxalate dihydrate and manganese carbonate were mixed with water in an amount sufficient to render the mixture fluid enough to pour and pump. The dopant metal precursors used were magnesium acetate and cobalt acetate. 85% Phosphoric acid in water by weight is slowly added to the mixture. After the acid addition is finished, lithium hydroxide is added and the mixture was mixed for about 30 minutes more.

The mixture was milled using zirconia media until the particles were reduced to approximately 50 nm in diameter. During the milling, cellulose acetate or other carbon source, i.e. glucose, lactose etc. was added to realize the carbon content as shown in Table 4.

The milled mixture was spray dried at 170° C. to agglomerate the small particles into essentially spherical secondary particles having diameters of up to about 20 microns. The spray dried particles were heated under an atmosphere containing <100 ppm oxygen. The particles were heated from room temperature to 400° C. in three hours and held at 400° C. for one hour. The temperature was then increased to 650° C. in two hours and held at 650° C. for three hours. The heated particles were cooled to below 60° C. and sieved through a 44 micron sieve. The LMFP characteristics are shown in Table 4.

The LMO of Comparative Example 5A was made into a 20 Ah cell in the same manner as above but using Comparative Example 5 LMO. Comparative Example 5B was the same as Comparative Example 5A except a 20 Ah cell was made using a mixture of Comparative Example 5's LMO and the just described LMFP in a ratio of LMO/LMFP of 7/3.

Comparative Example 5A when subjected to the nail penetration test resulted in a fire at a cut off voltage of 4.05 volts. Comparative Example 5B resulted in a fire at a cutoff voltage of 4.2. Both Examples 9A and 9B resulted in no fire (i.e., passed the test). The improved safety performance of the LMO of this invention is believed to be due to, at least in part, with the Mn/Ni ratio of the primary particles, which is also believed to be correlated with the oxygen evolution compared to the LMO of Comparative Example 5.

Examples 10-13 were made in the same manner as Example 1, except that differing precursor particulates were used as shown in Table 3 and the heating to form the LMO was to 950° C. for 3 hours.

From Table 3 it is apparent that the particulate precursor may be varied so long as the particulate size of the Ni and Co containing precursor particulate.

Examples 14-17

In these Examples the LMO was made in the same manner as Example 1, except that the precursor containing Mn (i.e., $Mn_2O_3$) was milled separately from the other precursor particulates and later mixed to form a slurry with all of the precursor particulates having a solids loading of about 45%.

The Mn precursor slurry had a solids loading of 45% and was milled for a time to realize the particulate size shown in Table 5. These examples were also heated to 950° C. for 3 hours with a ramp rate of 8 hours up and down to the final temperature. The milling and other procedures were essentially the same as in Example 1.

From Table 5, it is readily apparent that the size of the Mn precursor may be larger than the precursor containing Ni and Co and still achieve an LMO having good EC performance and ease of processing while also allowing for good safety as shown by the Mn/Ni surface ratio as well as evolved oxygen. This surprising result allows for more robust commercial manufacturing of LMO with improved safety as well as having excellent cycle life and good EC performance.

Examples 18-21

The LMO of Examples 18-21 were made the same way as in Example 1 and as follows. The bulk chemistry of the LMO was $LiNi_{0.6}Mn_{0.2}Co_{0.2}O_2$. Each of these Examples used the same raw materials in the same proportion necessary to make this LMO except that no excess of Li was used (i.e., Li equal to about 1). The particulate precursors used were $Li_2CO_3$, $Ni(OH)_2$, $Mn_2O_3$ and $Co_3O_4$.

The heating schedule to form the LMO was heating to 600° C. in 6 hours, held at 600° C. from 4 hours, heated to 930° C. in 5 hours, held at 930° C. for 5 hours and then cooled to room temperature in about 10 hours. The precursor particulate size and characteristics of the LMO are shown in Table 6.

Table 6 also shows data for Comparative Example 6, which is a commercially available LMO from Ecopro Co. Ltd, Cheongwon-gun, Chingcheongbuk-do, Korea under the trade name NCM080-10A(NMC622) having essentially the same chemistry as Examples 18-21. Comparative Example 6 was formed via a precipitation process to form a precursor compound containing Ni, Co, and Mn that is then mixed with a lithium precursor and heated to form the LMO.

Table 6 shows that the LMO having a higher nickel content may be formed again with a substantial amount of particulates exceeding 0.5 micrometers. Even though the LMO may be formed with even smaller particles (i.e. essentially all less than 0.5 micrometers), it is not desirable, because from the data it appears the grain growth becomes more difficult to control, which will be deleterious when making it at commercial scale (see lower BET surface area even though starting with smaller narrower distributed particles).

Even though not shown, when the LMO's of Examples 18-21 are pressed as when forming the cathode layer on a metal foil, the density of these Example LMOs are on the order of 10 to 15% greater than the density of the Comparative Example 6's LMO. This allows for significantly higher capacity in the same battery volume.

Figure 2:
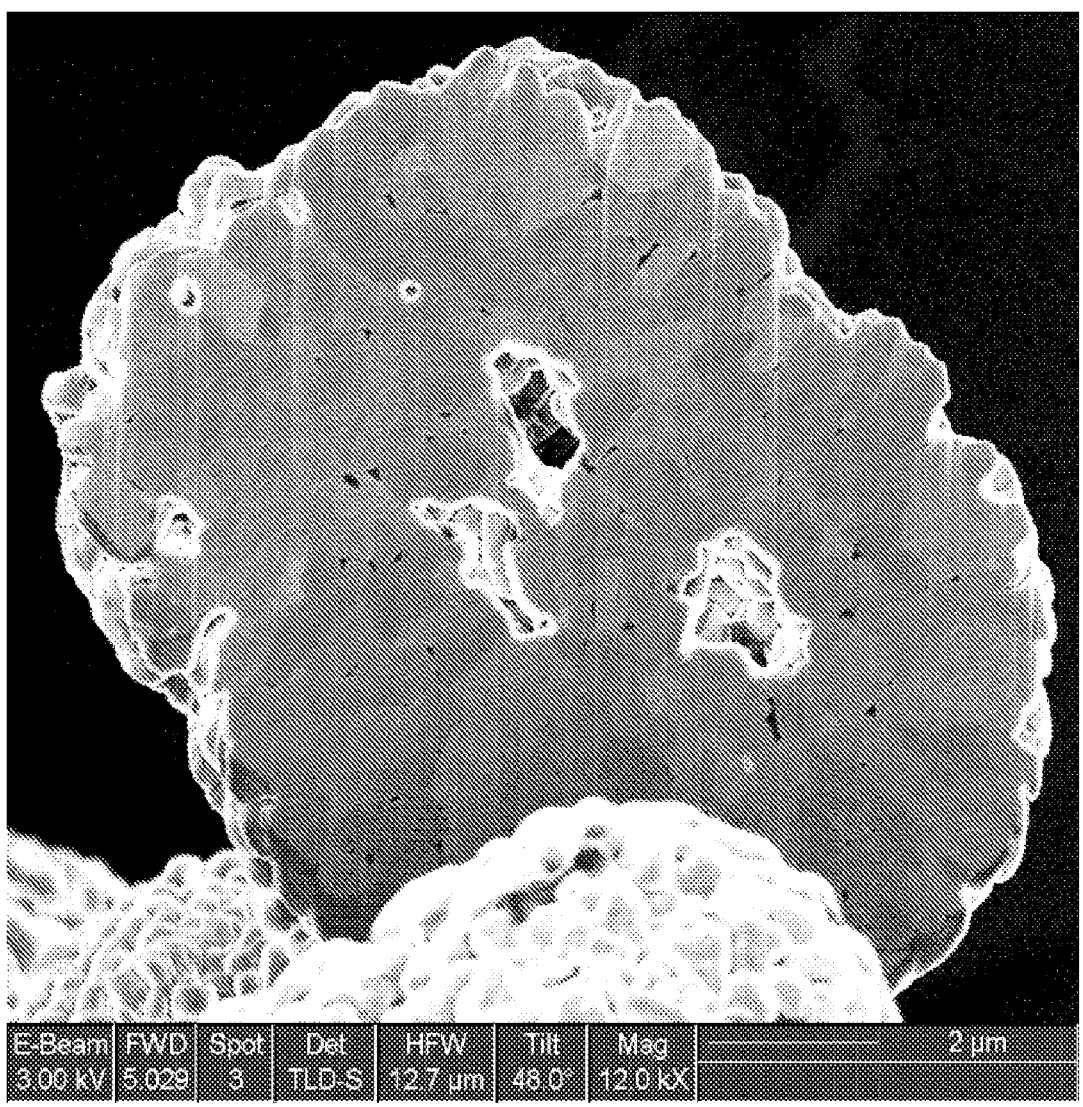
FIG. 2 is a scanning electron micrograph of a cross-section of a secondary particle of a lithium metal oxide of this invention.

It has also been observed that the LMO produced by the invention's method can result in LMO having highly dense secondary particles that still have excellent EC performance. This is, believed to be due perhaps in part to the primary particle size distribution of the Ni and Co precursors and ability to realize high solids loading of a slurry with all the precursor compounds. FIG. 1, which is a cross-section of Example 1 shows the significant difference in the porosity of the secondary particles of the LMO of this invention compared to the typical LMO formed by precipitation (see FIG. 2; cross-section of Comparative Example 6 LMO).

Examples 22-27

The LMO of Examples 22-27 were made in the same manner as Examples 18-21, but the spray dryer conditions were varied so as to achieve differing secondary particle size distributions as shown. From the data, when spray drying to agglomerate the powders, it is preferred that the D10 not be less than 5 micrometers, because fracturing of the secondary particles was observed upon heating to form the LMO. Even though a useable battery may be made from such LMO, the cycle life will generally substantially suffer compared to the cycle life of batteries made LMOs where the secondary particles are substantially intact.

TABLE 1

| Raw materials | Formula | MW (g/mol) | Supplier | Purity (%) | Particle size | Density (g/cc) | Other characteristics |
|---|---|---|---|---|---|---|---|
| Lithium carbonate | $Li_2CO_3$ | 73.9 | SQM | 99.4% | d50: 5.7 μm<br>d90: 11.4 μm<br>d100: 26.3 μm | | Tap density = 0.78 g/cc |
| Nickel (II) Hydroxide* | $Ni(OH)_2$ | 92.7 | Alfa Aesar | Ni = 61%<br>99.7 (metal basis) | −325 mesh | 4.1 | Green powder, Solubility 0.13 g/L in water |
| Nickel (II) Hydroxide* | $Ni(OH)_2$ | 92.7 | Palm | Ni = 62.8% | −325 mesh | 4.1 | Green powder, |
| Manganese (II) oxide | $Mn_2O_3$ | 157.87 | Sigma-Aldrich | Mn = 69.3%$_{[gravimetric\ analysis]}$ = 71.7%$_{[Titanium\ by\ KMnO_3]}$ = 99.99%$_{(trace\ metal\ basis)}$ | −325 mesh | 4.5 | Black powder |
| Cobalt (II, III) oxide* | $Co_3O_4$ | 240.8 | Alfa Aesar | 99.7%$_{(metal\ basis)}$ | −400 mesh | 6.11 | Black powder, |
| Cobalt (II, III) oxide* | $Co_3O_4$ | 240.8 | Freeport Cobalt | Co = 72.5% | d100 <20 μm<br>d95 <10 μm | | |
| Polyacrylic acid | $(C_3H_4O_2)_4$ | ~1800 | Sigma-Aldrich | 99% | | | White powder |
| Nickel (II) carbonate hydroxide tetrahydrate | $Ni_5(CO_3)_2(OH)_6 \cdot 4H_2O$ | 587.59 | Sigma-Aldrich | 45~52.5% Ni with Dimethylglyoxime | | | Lime green or Light Green powder |
| Manganese (II, III) Oxide | $Mn_3O_4$ | 228.82 | Erachem | Mn = 71.2%; $H_2O$ <0.6%<br>S = 0.04; <100 ppm other metals | | | Fine brownish powder |
| Manganese carbonate | $MnCO_3$ | 114.95 | Sigma-Aldrich | >99.9%$_{(trace\ metal\ basis)}$ | d90 <5 μm | | |
| Cobalt hydroxide | $Co(OH)_2$ | 92.93 | Freeport Cobalt | Co = 61.5% | d100 <20 μm<br>d97 <5 μm | | |

TABLE 2

| Example | Precursor particle size distribution* | | | | High temperature calcination ** | | XPS, surface (Mn/Ni) | Surface Co percentage (%) | Tap density (T.D.) (g/cc)*** | Electrochemical performance (E/C) | | Oxygent Evolution (%) |
|---|---|---|---|---|---|---|---|---|---|---|---|---|
| | d10 (μm) | d50 (μm) | d90 (μm) | d100 (μm) | Temperature (° C.) | time (hr) | | | | C/10 Discharge capacity, mAh/g, | Rate capability, 5 C/0.1 C | |
| 1 | 0.20 | 0.30 | 0.78 | 1.1 | 950 | 5 | 0.53 | 15.69% | 2.0 | 165 | 80.6% | |
| 2 | 0.20 | 0.30 | 0.78 | 1.1 | 950 | 1.5 | 0.65 | 14.98% | 2.14 | 164 | 80.9% | 13 |
| 3 | 0.20 | 0.30 | 0.78 | 1.1 | 950 | 1 | 0.61 | 14.08% | 1.12 | 165 | 81.9% | |
| 4 | 0.20 | 0.30 | 0.78 | 1.1 | 930 | 15 | — | — | 1.1 | 163 | 76% | |
| 5 | 0.20 | 0.31 | 0.90 | 1.02 | 950 | 5 | 0.63~0.59 | 13.6~14.1% | 2.1 | 164 | 81.7% | |
| 6 | 0.18 | 0.28 | 0.41 | 0.95 | 950 | 3 | — | — | 2.07 | 165 | 80% | |
| 7 | 0.25 | 0.48 | 0.80 | 2.55 | 950 | 15 | 0.66 | 14.29% | 1.39 | 159 | 74.2% | |
| 8 | 0.25 | 0.48 | 0.80 | 2.65 | 950 | 5 | 0.73 | 13.75% | 1.18 | 159 | 75.47% | |
| Comp. 1 | 0.20 | 0.30 | 0.78 | 1.1 | 1050 | 40 mins | 0.58 | 17.53% | 2.3 | — | — | |
| Comp. 2 | 0.48 | 0.81 | 1.95 | 2.78 | 950 | 10 | — | — | 1.1 | 157 | 75% | |
| Comp. 3 | 0.48 | 0.81 | 1.95 | 2.78 | 1000 | 5 | — | — | 2.07 | 151 | 60% | |
| Comp. 4 | 0.48 | 0.81 | 1.95 | 2.78 | 950 | 5 | — | — | 1.0 | 158 | 81% | |
| Comp. 5 | — | | | | — | | 0.48 | 15.76% | 2.08 | 165 | 79% | 100 |

TABLE 3

| Example | Milled slurry median particle size (μm) £ | Particle size distribution | | | | Li | Ni | Mn | Co | Tap density (T.D.) (g/cc) | Evolved oxygen amount (%) ¥ | Electrochemical performance (E/C) | |
|---|---|---|---|---|---|---|---|---|---|---|---|---|---|
| | | d10 (μm) | d50 (μm) | d90 (μm) | d100 (μm) | | | | | | | C/10 Discharge capacity, mAh/g | Rate capability, 5 C/0.1 C |
| 9 | 0.3 | 0.21 | 0.3 | 0.48 | 1.01 | $Li_2CO_3$ | $Ni(OH)_2$ | $Mn_2O_3$ | $Co_2O_4$ | 2.29 | 58.19% | 164 | 79.8% |
| 10 | 0.32 | 0.19 | 0.32 | 0.79 | 1.50 | $Li_2CO_3$ | $Ni_5(CO_3)_2(OH)_6$ | $Mn_3O_4$ | $Co_2O_4$ | 2.1 | 54.68% | 167 | 76.6% |
| 11 | 0.29 | 0.18 | 0.29 | 0.95 | 1.20 | $Li_2CO_3$ | $Ni(OH)_2$ | $Mn_3O_4$ | $Co_2O_4$ | 2.03 | 33.06% | 160 | 80% |
| 12 | 0.28 | 0.16 | 0.28 | 0.96 | 1.40 | $Li_2CO_3$ | $Ni(OH)_2$ | $Mn_3O_4$ | $Co(OH)_2$ | 1.95 | 12.03% | 167 | 80.2% |
| 13 | 0.29 | 0.15 | 0.23 | 0.39 | 1.30 | $Li_2CO_3$ | $Ni(OH)_2$ | $MnCO_3$ | $Co_2O_4$ | 2.09 | 23.59% | 166 | 81% |

TABLE 4

| Characteristic | LMFP |
|---|---|
| Chemistry | $Li_{1.05}Mn_{0.75}Fe_{0.15}Mg_{0.05}Co_{0.003}PO_4$ |
| Surface Area ($m^2/g$) | 24 |
| D10 (μm) | 3.8 |
| D50 (μm) | 8.2 |
| D90 (μm) | 13 |
| Tap density (g/cc) | 1.1-0.9 |
| Sphericity Secondary Particles | 1.195 |
| True density (g/cc) | 3.45 |
| Carbon (wt %) | 3 |

TABLE 5

| Example | particle size distribution for Li/Ni/Co particulate precursors | | | | Particle size distribution for Mn particulate precursor | | | | Tap density (T.D.) (g/cc) | Mn/Ni | Evolved oxygen amount (%) ¥ | Electrochemical performance (E/C) | |
|---|---|---|---|---|---|---|---|---|---|---|---|---|---|
| | d10 (μm) | D50 (μm) | D90 (μm) | d100 (μm) | d10 (μm) | d50 (μm) | d90 (μm) | d100 (μm) | | | | C/10 Discharge capacity, mAh/g | Rate capability, 5 C/0.1 C |
| 14 | 0.17 | 0.28 | 0.67 | 1.03 | 0.42 | 1.16 | 2.5 | 6 | 1.7 | | 54 | 163 | 79.9% |
| 15 | | | | | 0.40 | 0.95 | 1.65 | 5.2 | 2.03 | | 75 | 163 | 79.9% |
| 16 | | | | | 0.28 | 0.60 | 1.66 | 2.8 | 2.1 | | 95 | 163 | 80.2% |
| 17 | | | | | 0.22 | 0.35 | 1.2 | 1.54 | 2.13 | | 97 | 162 | 81.6% |

TABLE 6

| Ex. | Precursor particulate Primary Particle Size D10/D50/D90 (μm) | LMO Secondary Partic Size D10/D50/D90 (μm) | Tap density (g/cc) | BET surface area ($m^2/g$) | Discharge Capacity C/10, 0.5 C, 1 C, 5 C mAh/g | Mn/Ni | LMO Secondary Particle Porosity (%) |
|---|---|---|---|---|---|---|---|
| 18 | 0.31/0.76/1.24 | 6.4/21.8/41.9 | 2.50 | 0.27 | 201, 187, 181, 150 | | |
| 19 | 0.23/0.41/0.69 | 7.4/19.4/37.0 | 2.27 | 0.25 | 202, 187, 179, 152 | | |
| 20 | 0.16/0.25/0.68 | 8.3/22.2/39.9 | 2.44 | 0.23 | 201, 186, 180, 157 | 0.35 | 0.2 to 0.4 |
| 21 | 0.07/0.10/0.28 | 8.4/22.2/40.0 | 2.42 | 0.19 | 201, 187, 180, 151 | | |
| Comp. 6 | | 7.3/9.9/15.2 | 2.3 | 0.43 | 202, 190, 184, 164 | | 6 to 9 |

TABLE 7

| Ex. | Particle Size Precursor Secondary Particulates D10, D50, D90 (μm) | LMO Secondary Particulate Size D10, D50, D90 (μm) | Tap density (g/cc) | BET surface area (m²/g) | Discharge capacity C/10, 0.5 C, 1 C, 5 C (mAh/g) | Secondary particle fracturing |
|---|---|---|---|---|---|---|
| 22 | 9.7/29.0/55.4 | 8.4/22.0/40.7 | 2.41 | 0.29 | 197, 183, 176, 147 | No appreciable amount observed |
| 23 | 6.3/24.2/46.8 | 7.1/18.3/34.4 | 2.36 | 0.36 | 199, 184, 176, 149 | No appreciable amount observed |
| 24 | 7.1/20.4/38.9 | 6.1/15.6/30.5 | 2.35 | 0.44 | 200, 186, 179, 150 | No appreciable amount observed |
| 25 | 4.8/15.3/30.0 | 4.8/12.5/27.0 | 2.32 | 0.48 | 200, 187, 180, 147 | Substantial amount |
| 26 | 4.7/12.4/23.8 | 4.0/10.4/24.6 | 2.16 | 0.56 | 200, 187, 180, 152 | Substantial amount |
| 27 | 2.9/10.2/20.3 | 3.5/9.5/21.4 | 2.14 | 0.59 | 202, 189, 183, 155 | Substantial amount |

The invention claimed is:

1. A method to make a lithium metal oxide powder comprised of Li, Ni, Mn, Co and oxygen useful to make a lithium ion battery cathode, comprising
    (a) providing a precursor mixture comprising a particulate precursor comprised of Li, Ni, Co and oxygen and providing a Mn particulate precursor devoid of Ni and Co, wherein the particulate precursor comprising Li, Ni, Co, and oxygen has an unagglomerated primary particle size having a D50 of 0.1 to 0.8 micrometer, D10 of 0.05 to 0.3 micrometer, D90 of 0.35 to 1.5 micrometer and no particles essentially larger than 3 micrometers, wherein the Mn particulate precursor is milled separately from the particulate precursor comprised of Li, Ni, Co, and oxygen,
    (b) agglomerating the precursor mixture to form secondary particles comprised of primary particles of the particulate precursor comprised of Li, Ni, Co and oxygen and the Mn particulate precursor,
    (c) heating the secondary particles under an oxygen containing atmosphere to a temperature of from 930° C. to 960° C. and time to form the lithium metal oxide powder.

2. The method of claim 1, wherein each particulate precursor is an oxide, hydroxide, carbonate or combination thereof.

3. The method of claim 1, wherein the Mn particulate precursor is devoid of Li.

4. The method of claim 3, wherein the precursor mixture is comprised of a Ni particulate precursor, a Co particulate precursor and a Li particulate precursor and the Mn particulate precursor in which each of the Ni particulate precursor, the Co particulate precursor, the Li particulate precursor, and the Mn particulate precursor does not contain a metal in any of the other particulate precursors.

5. The method of claim 1, wherein the Mn particulate precursor has an unagglomerated primary particle size D50 that is larger than the D50 of the particulate precursor comprised of Li, Ni, Co and oxygen.

6. The method of claim 1, wherein the heating is to a maximum temperature and at least one lower interim temperature that is held for a period of time.

7. The method of claim 1, wherein the atmosphere is an oxidizing atmosphere where oxygen is present in an amount of at least 0.01 to 0.3 oxygen partial pressure in atmospheres.

8. The method of claim 7, wherein the oxygen partial pressure decreases during the heating.

* * * * *